United States Patent

[11] 3,622,803

[72] Inventors Donald F. Cooper
Woodland Hills;
Harold Marchant, Santa Monica; Henry L. Herold, Los Angeles, all of Calif.

[21] Appl. No. 28,181
[22] Filed Apr. 13, 1970
[45] Patented Nov. 23, 1971
[73] Assignee Delaware SDS, Inc.
El Segundo, Calif.
Continuation of application Ser. No. 460,408, June 1, 1965, now abandoned. This application Apr. 13, 1970, Ser. No. 28,181

[54] CIRCUIT NETWORK INCLUDING INTEGRATED CIRCUIT FLIP-FLOPS FOR DIGITAL DATA PROCESSING SYSTEMS
8 Claims, 7 Drawing Figs.

[52] U.S. Cl. ........ 307/247,
307/289, 307/259, 307/215, 307/269
[51] Int. Cl. ........ H03k 23/04
[50] Field of Search ........ 307/269,
243, 247, 259, 289, 215

[56] References Cited

UNITED STATES PATENTS

| | | | |
|---|---|---|---|
| Re.26,082 | 9/1960 | Osborne | 307/215 |
| 2,816,237 | 12/1957 | Hageman | 307/247 |
| 2,985,773 | 5/1961 | Dobbie | 307/215 |
| 3,124,705 | 3/1964 | Gray | 307/208 |
| 3,145,309 | 8/1964 | Bothwell | 307/208 |
| 3,171,984 | 3/1965 | Eshelman | 307/215 |
| 3,299,285 | 1/1967 | Cannon | 307/208 |
| 3,305,728 | 2/1967 | Bailey | 307/208 |
| 3,219,845 | 11/1965 | Niehe | 307/215 |
| 3,247,399 | 4/1966 | Moody | 307/269 |
| 3,310,686 | 3/1967 | Valentine | 307/247 |
| 3,351,778 | 11/1967 | Seelbach et al. | 307/247 |
| 3,440,449 | 4/1969 | Priel et al. | 307/269 |
| 3,445,684 | 5/1969 | Uimari et al. | 307/269 |
| 3,535,544 | 10/1970 | Detroye | 307/269 |

*Primary Examiner*—Donald D. Forrer
*Assistant Examiner*—Harold A. Dixon
*Attorney*—Smyth, Roston & Pavitt

ABSTRACT: An integrated circuit flip-flop with master and slave portions. The slave portions being conventional cross coupled NOR gates, the master portion constructed for set over ride reset response to input signals and having two outputs, only one output changes with the other clock pulse phase. Determination as to which output changes is made during the clock pulse phase when both outputs are similar and in dependence upon set and/or reset inputs then received. The state of the slave portion is determined by which one of the master outputs changes with the clock. The integrated circuit flip-flop is operated at a supply voltage lower than the voltage used for biasing discrete circuit logic and flip-flop input and output, with noise rejection diodes connected at the input.

INVENTORS.
HAROLD MARCHANT
DONALD F. COOPER
HENRY L. HEROLD
By
Smyth, Roston & Pavitt
ATTORNEYS.

INVENTORS.
HAROLD MARCHANT
DONALD F. COOPER
HENRY L. HEROLD
By
Smyth, Roston & Pavitt
ATTORNEYS.

CIRCUIT NETWORK INCLUDING INTEGRATED CIRCUIT FLIP-FLOPS FOR DIGITAL DATA PROCESSING SYSTEMS

This application is a continuation of application, Ser. No. 460,408, filed June 1, 1965, now abandoned.

The present invention relates to improvements in digital data processing systems.

One of the problems encountered in modern, high-speed, digital data processing systems arises from the fact that very large quantities of circuit elements are required for operation due to increased sophistication and versatility of operations. This results in a, relatively speaking, increase in space required to accommodate all of the elements. It has been found that this space requirement sets a limit in operational speed since the travel time of a signal through the system cannot be ignored any more as being negligibly small, and it constitutes a definite response delay in between successive operating steps. This delay, i.e., the signal travel time can only be reduced by shortening the travel paths for the signals, which leads to the suggestions of "crowding" the circuit elements to the utmost extent. The limiting factor here is, of course, accessibility to every element in the system in case it has to be replaced or even to detect its faultiness.

Accessibility of elements and price consideration further have lead to the development of circuit modules of a given standard size and comprising a printed circuit card as a basic structure element. Such modules, for example, contain a number of "and" gates, "or" gates with amplifiers, or a number of similar Schmitt triggers, or a number of relay drivers, all being mass produced to reduce cost and to facilitate quality control. The construction of a data processing circuit network is greatly facilitated when it can be assembled of such standardized modules. Even disregarding cost considerations, standardized modules with established and thus foreseeably uniform performance characteristics inherently increases the quality of the system. This type of design, however, inherently results in extensive intermodule connections, since the different units within a standardized module may be used for cooperation at different and spatially separated locations. As this arrangement of circuit modules is a rather organized and orderly one, the signal paths become even longer, as there will be no more "straight line" connection from element to element.

Another limiting factor for data processing systems is to be seen in that an increase of operation speed means shorter signals and pulses, so that the system assumes more and more the characteristics of a high-frequency circuit, which includes the problems arising from the fact that all circuit, i.e., wire connections become sources and receivers of "noise" causing intercoupling of elements in an almost unforeseeable fashion. Even a cursory glance into any high-speed computer being assembled with utmost care and exactness bears out the simple fact that it is a system of "randomly" distributed "noise sources" and "noise receptors," with each connection serving as a source as well as a receptor. Noise being transmitted among all components and connections through galvanic, inductive and capacitive coupling. This, of course, is the result of the fact that data processing involves the establishing of a large variety and combinations of switching path, each being travelled through by signals concurrently as well as sequentially in an infinity variety of sequences and combinations.

It thus appears that this noise as resulting from these infinitely variable noise sources has characteristics of a random phenomenon permitting only statistical considerations.

Unlike any HF system, not all connections in a data processing system transmit signals at any particular instance, so that the combination of connections carrying signals and those that are temporarily idle, varies from instant to instant to thereby establish an infinite variety of interelement and interwiring couplings. This severely restricts any attempt to balance the system electrically, i.e., to provide electrical means counteracting the resulting signal distortions and disturbances at any signal input within the system. This is particularly so, since the transfer of discrete pulses through a processing system becomes a random phenomena as far as the overall distribution of pertinent signal frequencies are concerned and as they effective at any instant anywhere.

It is further apparent, that the coupling effect as between wirings and elements within the system increases inversely with the cube of a representative overall, linear dimension of the system. The difficulties are further enhanced by the time-space considerations of noise: large distances required for interconnecting circuit elements may reduce the effect of cross coupling between such elements and thereby seem to reduce the danger of creating noise peaks anywhere within the system, but, as was stated above, large signal paths prolong the processing time due to signal delays resulting therefrom, and longer signal travel times increase the probability in time that disturbances may occur. The main delay, however, occurs if in flip-flops as they are conventionally employed, the switching signal assembly must be completed and maintained for a relatively speaking, extensive period of time before switching may occur.

The conventional flip-flops usually operate in a manner that when the clock pulse, considered as being positive or as being true, turns negative or false, trigger action occurs: falling clock trigger. Any setting or resetting of the flip-flop will depend on the input signals. Different types of known flip-flops, distinguishing among each other by the type of input signal combinations required to produce specific outputs, but all these trailing edge or falling clock trigger type flip-flops have in common that the input signals have to be assembled at the input terminals thereof prior to the occurrence of a clock pulse, i.e., at a time when the clock pulse still is false.

Thus, between the required completion or settling of the input signals of a flip-flop and the actual execution thereof upon occurrence of the trailing edge of the respective next clock pulse the following delays occur. There is first a delay given by the tolerance interval ahead of the leading edge of the clock pulse. The clock pulse, since materially participating in the execution of the flip-flop action, must have a minimum width which in addition is, of course, determined by the requirements of the data processing system as a whole. Since the clock pulse is also travelling through an extensive signal path throughout the entire processing system it may possibly be subjected to width tolerances, so that a maximum width tolerance must be considered here. Thus, lost time is introduced in that the input signals must have settled sufficiently long prior to the leading edge the average clock pulse width, and additionally, the clock pulse width plus tolerance period will elapse before any switching action may occur.

As was previously mentioned above, this relatively large delay has two effects: Since the delay is accumulative for all sequential flip-flop operations during any data processing routine, the total delay of the entire operation results from adding the delays in all of the sequentially executed flip-flop operations. This is a substantial period which may be offset by higher frequencies, but then the noise problems discussed above materialize more fully. The long delay increases further the probability in time of the induction of noise into any of the switching paths within the flip-flop, thus possibly giving rise to faulty operation.

It has to be considered further that in any such digital system there exists a large number of signal paths which are in fact similar. These are the signal paths which interconnect, for example, a number of transistors, diodes and resistors to establish a flip-flop. While within a flip-flop all these paths differ from each other (not necessarily electrically and symbolically, but physically), mass manufacturing and utilization of printed circuit cards for wiring will result in the fact that any switching path within any one flip-flop, has many counter parts, in all the other flip-flops throughout the system. This, however, by itself does not result in a particular and foreseeable pattern for the production and reception of noise, due to the high degree of "irregularity" of the overall distribution of flip-flops throughout the system. Nevertheless, the probability of the generation of local noise peaks is increased due to a multitude of "in phase" flip-flop switching operations, each being carried out in a similar fashion and by similar flows of current within the several concurrently operating flip-flops. In other words, the noise reception at many points within the system may cease to be a true random and averaged low-level noise phenomenom.

On the other hand, it has been found that if flip-flops are constructed as integrated circuits, the noise problem for each flip-flop and thus for all of the flip-flops employed is reduced since integrated circuits as such are susceptible of a relative high noise rejection. Specifically, a flip-flop made of discrete elements (i.e. individual diodes, transistors, resistors, etc.) is more susceptible to the reception of noise than a similar type flip-flop but constructed as integrated unit. This is probably primarily so, because an integrated circuit as a whole has small physical dimensions and thus offers a very small pickup area for receiving external noise signals. Cross coupling of noise signals into the circuit may effect the potential of the several connections within the flip-flop in a uniform manner, and thus will not disturb individual switching paths therein.

It has been found further that the noise problem, on one hand, and the reduction in the signal travel delay can be optimized if the input (and output) circuit logic of each flip-flop, which is different for almost every flip-flop, be composed of discrete circuit elements operated at higher voltage, whereby the signal paths between this discrete-element circuit logic and the input terminals of the flip-flops are provided with noise rejector elements, such as diodes, and if, preferably, the flip-flop be constructed to have an input signal assembly period during a clock pulse with switching occurring at the trailing edge of such clock pulse.

The reason behind such provision is not immediately apparent, but from the foregoing discussion it will be understood that the noise problem is not one in space alone, but also in time. Pluralities of noise sources and of noise-receiving elements will give rise to faulty operation to an increasing degree if successive operational steps within the system are executed with delay. Such a delay is not only produced by extensive signal travel times, but to this the delay between signal assembly and resulting switching operation is added. Shortening of the time between the assembly of signal, to carry out a specific switching step, for example, setting or resetting of a flip-flop, and the execution of such step itself will decrease the susceptibility of the system to faulty operation because the probability that each switching element receives noise is reduced.

Since, furthermore, the internal switching paths of the integrated circuit flip-flops are exceedingly small, the clock pulse width needed basically as time for these internal flip-flop operations can be very short, indeed, just sufficient to permit the "settling" of inputs and for them to be ready for the falling clock triggering. By spatially separating integrated circuit flip-flops having the clock pulse period as input signal assembly period, one obtains optimum decoupling of all elements as far as noise production and reception is concerned, provided integrated circuits and discrete circuits each are operated at voltages permitting best S/N ratios for either type.

The signal to noise ratio of a discrete element logic circuit is high if a voltage of about 10 volts is used, i.e., a voltage higher than that used for driving integrated circuits. The integrated circuit-type flip-flops appear within this logic network as single components, spatially kept apart from each other by the wiring that interconnects the discrete elements which are biased for operation at a higher power level. The inherent noise-rejection properties of low-voltage-operated integrated circuits are not overridden by too close a proximity with other circuit elements. The higher operating voltage for the discrete element circuit increases the S/N ratio for such circuit, but it also increases somewhat the noise itself, but the noise rejection means provided within the signal paths leading to the components within an integrated circuit flip-flop prevent such higher noise within such paths, through not affecting the discrete circuit logic, from flowing into the low-power-operated integrated circuit. The significant part here is that the signal flow accompanying the switching operation with a flip-flop is practically eliminated as externally effective noise source due to (1) the shortness of switching paths, (2) the reduction of the execution time of switching operation within a flip-flop, (3) the low-power level therein so that little noise is produced, (4) the maintaining of distances as between the several flip-flops within the system due to employment of discrete element circuit logic for coupling the flip-flops, and (5) the practical total lack of any cross coupling of the connections in the flip-flop with any other element.

It is decisive, that the "regular noise" produced by concurrent and "in phase" switching operations of a multitude of flip-flops is eliminated as source for creating unpredictable local noise peaks, and the residual noise now attains true random character with little probability for the occurrence of noise peaks anywhere and at any time. These advantages would be abandoned if the coupling network for the flip-flops were also integrated circuits. In such case the entire system would be amassed in a small space creating such close proximity of elements to again result in strong intercoupling of all the various signal paths within all such integrated circuits; moreover, external wiring is still required in this case having excessive cross coupling effects.

Integrated circuit flip-flops with a coupling logic comprised of discrete elements, exhibit longer signal paths than in case of a complete integrated circuit design, but this is more than offset by the now permissible use of higher switching and signal frequencies, by using the respective clock pulse time periods for flip-flop input signal assembly, and by eliminating any cross coupling between flip-flops due to spacing. Particularly the latter two features reduce the probability that any noise resulting from the higher powered signals travelling through the coupling circuits outside of any integrated circuit, will become effective in the integrated circuits.

The flip-flop which is specifically suggested here and described in greater detail below, operates substantially independent of the duration of the clock pulse width so that this pulse width is not a delay for the flip-flop operation. The inputs do not have to be assembled ahead of the leading edge of the clock pulse, but the flip-flop in accordance with the invention establishes during the positive clock pulse period an accept-input operational state, and it is required only, that due to a finite travelling time within the integrated circuit flip-flop, the input signals have to be settled at the input terminals of the flip-flop approximately 40 to 50 nanoseconds ahead of the trailing edge of the clock pulse. This reduces the delay as between settling of the input signals and the execution of a command that is inherent in the input signals, to less than half that of the conventional trailing edge trigger-type flip-flops. In particular the clock pulse width is completely eliminated from these considerations. The only requirement is that the clock pulses each must have a width, i.e., a minimum width, which permits any settled input signal combination to complete its travelling through the circuit paths during the positive clock pulse time. For clock pulse frequencies of $10^7$ c.p.s. and even above this requirement does not present any difficulties. The integrated circuit flip-flop of this type is coupled particularly with its input to a discrete circuit element logic.

The discrete elements may be mounted on a printed circuit card whereby the connecting wires are part of the etched connection pattern "printed" onto the base plate of the printed circuit card, and a flip-flop being of the integrated circuit and "falling clock - clock-time-input assembly type" appears on this card only as one of the components. Modules can be constructed in a very simple manner in that the gate structure for any or all of the inputs for the integrated circuit are included in the module. Additionally, expander gates may be provided as separate modules. Other modules may contain more than one of the type of circuits just outlined. Thus, there will be established within a data processing system a series of modules containing discrete circuit elements and in which the flip-flops appear as but one discrete circuit element operated at a lower voltage. A module circuit of this type on a single printed circuit contains at most only a few integrated circuits, thus keeping them apart and preventing amassing.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figures 1, 3A, 3B:
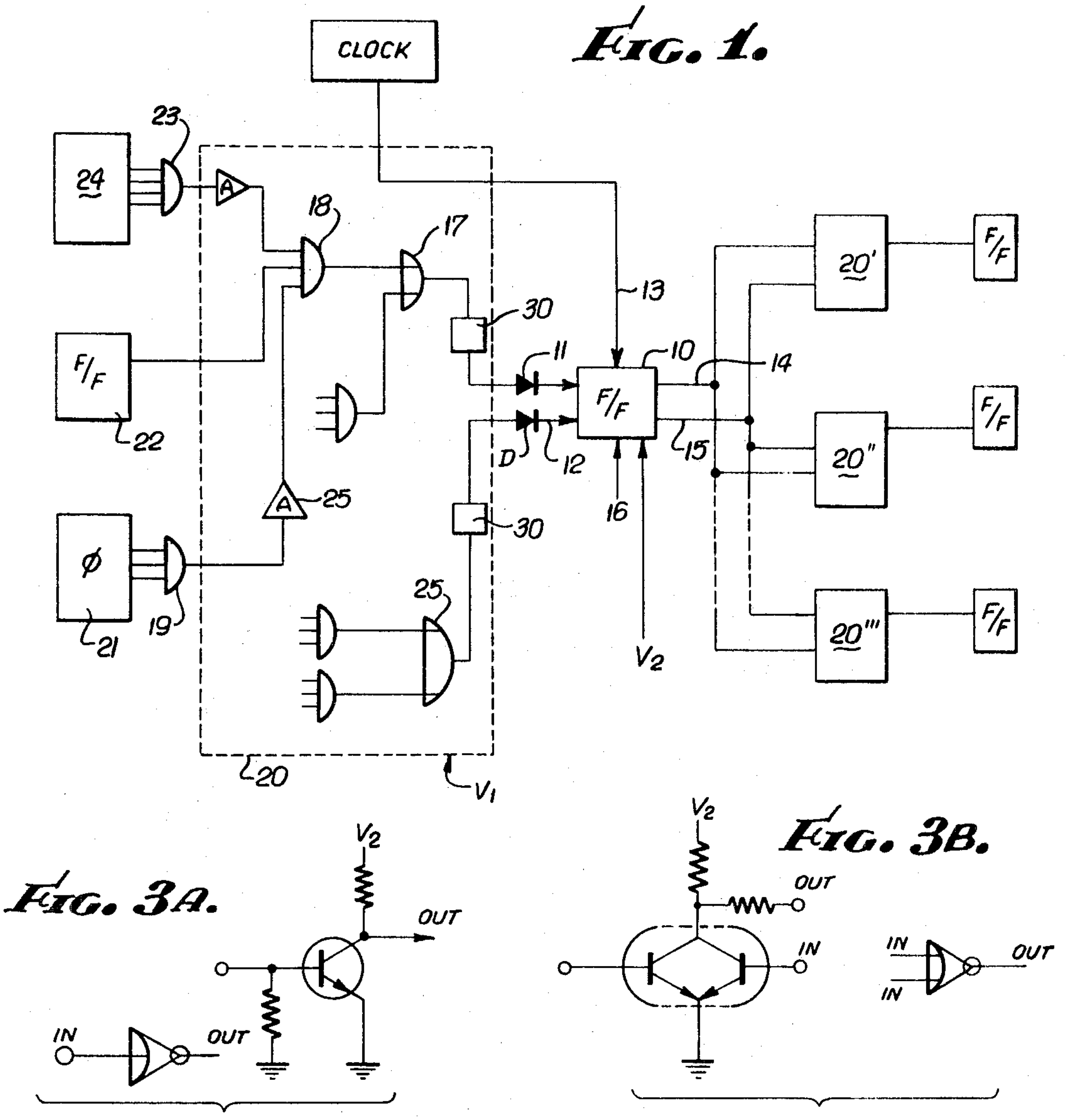
FIG. 1 illustrates a block diagram of a representative example for a portion of any typical data processing system to be constructed in accordance with the principles of the present invention.
FIG. 3A, 3B, 3C and 3D illustrates the correlation between the logic symbols used in FIG. 2 and the circuit configuration that may be represented by such symbols.

Proceeding now to the detailed description of the drawing, in FIG. 1 thereof there is shown a representative example of a flip-flop 10 with input circuit. This flip-flop 10 may be understood as being representative of the typical flip-flop as it is used in a data processing system such as a digital computer or in peripheral equipment for computers. This general aspect of the circuit shown in FIG. 1 requires some elaboration and verification.

In general, digital data processing includes a means converting external information into signals which can readily be handled by a processing system. External information, for example, is available in the form of holes or contrast markers arranged in a code pattern in punched or printed cards or tape, magnetization on magnetic storage means, the keys of an input typewriter, a measuring transducer or the like. This information must be converted into representative electrical, digital signals, i.e., pulses, whereby regardless of the specific digital code used all signals (bits) are represented as binary values. Such conversion requires two, possibly related steps to be taken. First, the external information must be sensed by a suitable sensing means adapted for interaction with the information carrier and providing electrical signals of suitable format.

Secondly, the processing of such electrical signals will be carried out at a power level suitable for operation of electronic elements, but the sensing of the external information may require a different, probably higher power level, so that there must be a conversion of operating power levels for the signals.

Data processing of such digital information as represented by suitably adapted input pulses basically includes the shifting and gating of such binary bits in a manner whereby groups or sequences of binary signals or both are caused to run along switching paths previously opened by respective other binary-type control signals, while data bits are to be inhibited from proceeding along other switching paths.

The execution of a computer program basically involves an organized change in the opening and closing of switching paths for the assembly of data representing the processed signals as desired solution, and which are quantities to be reconverted into externally usable information. Power equipment (such as printers, etc.) will be operated in response to such data as assembled.

The flow of signals between such input and output devices includes both, signals representing numerical quantities running along selected switching paths, and signals which control or contribute to the control of such switching paths and their selection and such latter signals themselves have to run along selected switching paths; there is no qualitative difference between such signals as far as their electrical representation is concerned.

Data processing thus involves the sequential assembly of uniform binary-type signals (bits) within the system, and the transfer of such assembled signals to a different location for another assembly together with other signals previously assembled at a different location. This process requires the guiding of signals along prescribed paths to become effective at different locations and such signals must be maintained to await completion of signal assembly at those locations. Extensive processing involves numerous assemblies of this nature, sequentially provide and timed or phased by a clock.

For handling such data flow principally tow types of circuit elements are employed for respectively handling such signal traffic. One type is usually described as gates, usually combining two or more signals derived from several paths into a single output path, whereby of course, the permissible passage of signals depends on the type of gates employed ( AND, OR, NOR, NAND, AND-OR etc.). The other basic type of element within such data processing system is a switching or bistable device such as a flip-flop. There exists different types of flip-flops, but they have in common, that they are capable of maintaining one or the other of two possible operating states beyond the duration of one or more input signals, while a change of state depends on the combination of input signals as applied.

These two basic elements are supplemented by a third type of element which are often combined with or incorporated in gates and flip-flops. This third type of element can be described as signal modifiers. An amplifier is such a modifier and is necessary because every signal within the system may cover an extended path and is often split up to be used at different locations; this requires amplification. Also, inversion into the complementary state of a signal is often required. Inversion and amplification are often combined. Flip-flops themselves can be considered as an assembly of gates and inverters intercoupled in such a manner that a desired and specific sustenance of the signals to be attained.

Thus, almost any data processing system can indeed be considered as being constituted by an appropriate assembly of networks of the type shown in FIG. 1 in which a particular flip-flop, is governed by input circuits comprised of a plurality of gates which in turn derive their signals from other flip-flops, whereby amplifiers and inverters may be interposed for power, impedance and/or logic matching. This holds true for any part of the data processing system. The initial production of binary bits result from outputs derived from sensing devices which are responsive to externally stored information, as stated, and there will be provided flip-flops, the inputs of which are capable of being influenced by such externally produced or reproduced signals such as the closing of electromechanical contacts or the like.

The data processing circuit proper will, of course, include gates and flip-flops for processing such signals, i.e., for guiding bits along preselected switching paths, and finally flip-flops will be used to control some high-powered output device such as a relay which operates a printer or any other peripheral output equipment which enables evaluation of the processing result by people.

This general principle includes also integrated peripheral equipment such as a magnetic tape unit, used as a temporary or permanent storage device within the data processing system, and the magnetic transducers therein are ultimately controlled by or in turn control themselves flip-flops with gates being provided to define signal paths to and from these flip-flops.

Also, data processing systems are usually equipped with memories such as magnetic ring core matrices or delay lines, and here the operation is carried out by the control current through wires traversing the several cores or other transducers, and likewise the current through the wires is controlled by flip-flops, while gates connect the input and output circuits of these flip-flops to the system in general. It can be seen, that it is permissible indeed to generalize by saying that all data processing systems and all equipment within the system can be understood as being comprised of circuits as shown representatively in FIG. 1.

Considering the FIG. 1 in detail, flip-flop 10 has input terminals 11 and 12 for two different types of input signals effective in the flip-flop 10 in accordance with the type of flip-flop employed. Unless the flip-flop is of the DC type, there will be a clock pulse terminal 13 receiving a clock pulse of a local clock oscillator, synchronizing the switching operations throughout the entire system and thus organizing the sequence of data assembly, transfer and disassembly. In this instance, the clock pulse occurring at the terminal 13 will be effective if there is a change in inputs as applied to the input terminals 11 and 12.

The signals at the output terminals 14 and 15 of the flip-flop 10 are either "true" or "false" depending upon the state of the input signals at terminals 11 and 12, whereby a change of the true and false output states will concur with the trailing edge of a clock pulse as applied to terminal 13 (falling clock trigger). The flip-flop 10 may have an erase terminal 16 to receive either a gating or an erase signal (depending on polarity) to provide clock independent enabling to disabling.

The flip-flop 10 within its internal circuitry includes means for noise rejection particularly as to noise tending to enter the flip-flop through the input circuit gates and to be described by way of example more fully below. Furthermore, flip-flop 10 is operated from a voltage source V2 which is relatively low. Flip-flop 10 is to be constructed as an integrated circuit unit and will be described in detail below. The input circuit of such a flip-flop 10 is denoted with reference number 20 and will, in general, comprise discrete circuit elements briefly to be outlined in the following.

Usually a flip-flop input terminal such as 11 is capable of receiving more than one single operation signal, and in order to accommodate these alternative signals an "OR" or "NOR" circuit of gate 17 is provided. The "OR" circuit 17 may have several input terminals. For purposes of implementation it may be necessary to provide several "OR" circuits arranged in a staggered arrangement, since usually "OR" circuits of the diode type or transistor type will not operate properly at more than three inputs.

A typical input circuit for such an "OR" input terminal will comprise an "AND" (or "NAND") gate such as 18, combining several signals to produce coincidence signals (signal assembly). Upon concurrence of signals at all of its inputs there will be produced an output serving as input signal for the flip-flop. Representatively, this "AND" gate is shown as having three inputs.

One input terminal of gate 18 is, for example, connected to another "AND" gate 19 there being an amplifier interposed in this connection. "AND" gate 19 may have three input terminals, and they may be connected to a phase counter 21. Data processing systems are often arranged in a manner that for different subroutines the data processing system is put into a particular operating state as defined by a "phase" compelling the system to operate in a particular mode, and thus permitting only certain operating steps to the exclusion of others. The various phases are established by state or phase signals drawn from a phase counter. Thus, the coincidence gate 19 responds to a particular counting state of the phase counter 21, and produces a true signal for one particular phase. The "AND" gate 18 can thus respond only during that phase. The phase counter will itself comprise of flip-flops each having its own input circuitry. A three-state phase counter is assumed, but this number is entirely arbitrary.

The second input of "AND" circuit 18 may include a flip-flop 22, also of the same type as the flip-flop 10 and establishing at particular times a particular type of information to be passed on to gate 17, and to be used to the purposes of switching the flip-flop 10 when all the other operating conditions for such switching operations are established. This particular link shows that indeed the data processing comprises shifting of certain state signals from one flip-flop to other flip-flops via gating networks regardless of the purpose, character and meaning of the quantity or quality represented by such signals.

The third input of "AND" circuit 18 is comprised of a coincidence gage assembly 23 comprising of a number of "AND" gates staggeredly arranged, to accommodate five input signals for establishing a coincidence signal. These input terminals are connected to another counter 24. This counter 24 may, for example, be a five-stage binary counter. In case of a serial operation at the location presently described, this particular flip-flop 10 may be required to operate for a particular bit position within a, for example, 24-bit word format, as may be used for this particular data processing system. Thus, the bit counter 24 will run cyclically through 24 counting states, and in accordance with the serial transmission of bits from the word stored in parallel in a register of which for example the flip-flop 22 is a component, the transmission of such a signal is to be made dependent upon a serial transfer or phasing operation controlled by such a bit counter 24.

The other input circuits for the "OR" gate 17 are composed in a similar, a simpler or a more elaborate manner as the case desires. Likewise, the input circuit of the signal to be applied to the terminal 12 may comprise similar elements including an "OR" gate 26 and other gates, but, of course, at times a simple resetting signal may suffice for operation.

The input circuit network 20 including the gates 17, 18, amplifiers 25, eventually gates 19 and 23 and other gates for "OR" gates 17 and 26, will be mounted, preferably on one or several printed circuit cards. These gates and amplifiers basically consist of diodes, resistors, and transistors, possible also including capacitors, assembled on the printed circuit cards as discrete elements. Moreover, the printed circuit card that carries gates 17 and 26 may also carry the integrated circuit flip-flop 10.

The output terminals of flip-flop 10 lead to individual logic networks 20', 20'', 20''', etc. destined to combine the output signals of flip-flop 10 with others to in turn control other flip-flops, also integrated circuits, with logic networks 20', 20'' and 20''' being composed of discrete circuit elements. The networks 20, 20', 20'', etc. to the exclusion of flip-flop 10 and others are operated at a voltage V1 that is higher than voltage V2, to improve the S/N ratio within the network. The input circuits of the other flip-flops 22, those included in counters 21 and 24 and others have similar type input circuits.

The representative assembly illustrated includes four types of connections. There are the connecting paths within the integrated circuit flip-flops. There are the input-output wires for each of the circuit elements employed within the several gates and including the lead-in wires for integrated circuit flip-flop 10. There are the etchings on the printed circuit card electrically interconnecting the gate assembly 20, 20', 20''etc. and there are intermodule wires such as those leading to gates 23, 19, etc. as well as to those elements controlled by flip-flop 10. The spacing provided by the inherent extension of the "-wiring" within (i.e. on) the printed circuit as well as by connecting wiring between the different printed circuit cards or modules establishes dimension within the system in which there is little probability that any location noise peaks may appear.

Additionally, there are noise rejectors, diodes D and signal level matching circuits 30 interposed between for example the output terminals of "OR" gates 17 and 26 and the input lines 11 and 12. The signal transfer in the gating system 20 operates for example by establishing "true" signals at a level approximating V1, while a "false" signal is approximately at ground or zero level. The flip-flop operates with "true" signals at the relatively low level V2 with "false" also being at about zero or ground. Thus, network 30 matches the signal level range V1–0 of the discrete element circuit logic of network 20 to the signal level range V2–0 of the integrated circuit flip-flop 10. The noise-rejector diodes are dimensioned to have a threshold response sufficient to reject the transmission of relatively high-powered "noise" as picked up by the wiring of the discrete circuit logic, into the more sensitive integrated circuit flip-flop. The noise-rejecting components such as diodes D may be part of the integrated circuit.

As was briefly explained above, the specific connection pattern for any flip-flop input circuit such as 20 will follow the general pattern, as outlined, but it will differ greatly in detail from practically all the input circuits of the other flip-flops within the entire system, so that the inter flip-flop wiring establishes a true random distribution of noise sources and receivers. Moreover, the low-powered integrated circuit flip-flops having dimensions comparable with that of a single diode or transistor can thus provide neither a noise source nor a noise receiver as far as inductive or capacitive noise transmission from flip-flop to flip-flop is concerned, due to the spacing between circuit elements provided by the discrete circuit elements for interconnecting flip-flops. Hence, the probability of establishing any noise peaks is greatly reduced, so is the probability that any flip-flop will be found in a location of any noise peak. The integrated circuits themselves will operate substantially noise free since the flip-flops are low powered and thus cannot induce into the discrete circuit logic any material noise. Nor will the phase coherent internal switching operation of many flip-flops for example of the counter flip-flops 21 and 24 and of numerous others become effective as sources fór localized noise peaks.

As was outlined above, the prevention of noise induction into the flip-flops depends largely on the reduction in operating time of the flip-flop to reduce the probability that noise peaks are induced into flip-flops or their input lines so as to distort flip-flop switching operations. This, in turn, is accomplished by operating the flip-flop as "falling clock trigger" with signal assembly during the positive clock pulse phase, by noise-rejection elements in the signal input path, and by stabilizing the respective operating state of the flip-flop.

Figures 2, 4:
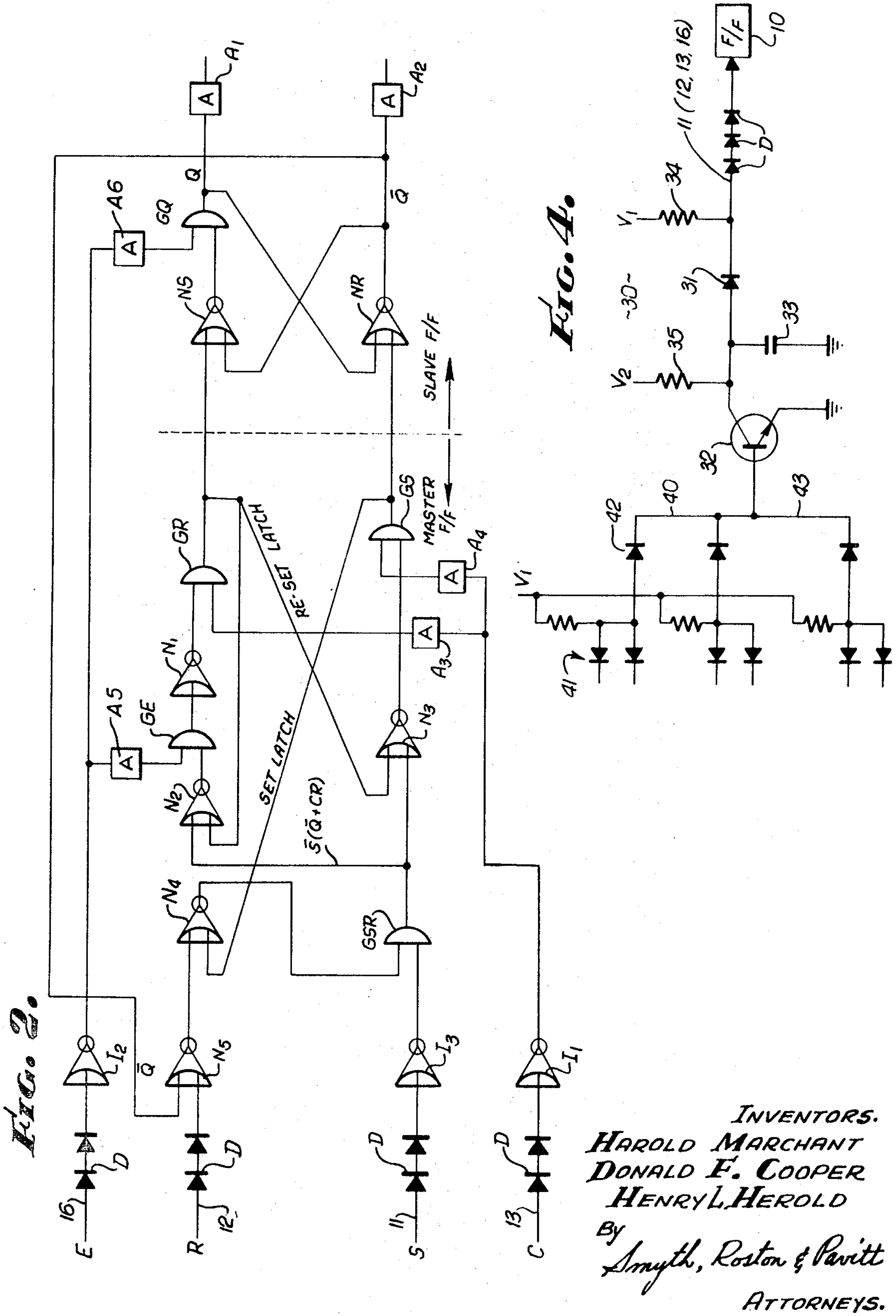
FIG. 2 illustrates a new integrated circuit flip-flop to be operated in a system as shown in FIG. 1.
FIG. 4 illustrates a coupling network between an integrated circuit flip-flop and its input logic composed of discrete circuit elements.

In FIG. 2, there is shown the logic diagram of an integrated circuit flip-flop incorporating the features of the present invention. This flip-flop is composed of circuit elements to be outlined with reference to FIGS. 3A to 3D. Briefly, FIG. 3A illustrates an inverter as composed of a transistor resistor configuration with grounded emitter, input terminal at the base electrode of the transistor and an output terminal at the collector thereof.

FIG. 3B illustrates in a circuit diagram as well as in logic symbols the preferred type of gate used for such integrated circuit flip-flops, which is a "NOR" circuit, i.e., the output thereof is true only if the two inputs are both false, so that the output is false, if either or both of the inputs are true. This "-NOR" circuit is implemented by two transistors having interconnected collectors and interconnected emitters, the later electrodes being grounded and the former electrodes serving as common output terminal. The two input signals are applied to the two base electrodes.

The "NOR" circuit of the type shown in FIG. 3B is preferred for integrated circuit configuration, because it shows that the electrical interconnections of collector and/or emitter electrodes can be implemented by using for the two transistors the same N conductive semiconductor layer region, requiring only that the two base electrodes as defined by P conductive regions be separated from each other, but they must be contiguous with the collector and emitter regions.

Figure 3C:
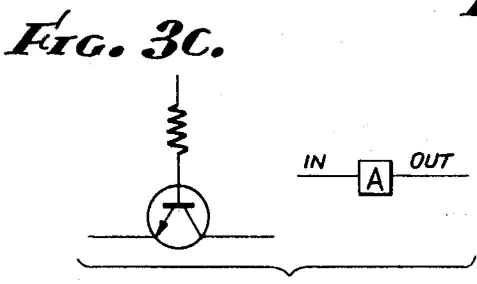

FIG. 3C illustrates that for increasing the signal gain within the flip-flop a simple amplifier can be employed in form of a transistor with the input applied to the emitter thereof, the output being drawn from the collector electrode, while the base receives operating potential V2.

Figure 3D:
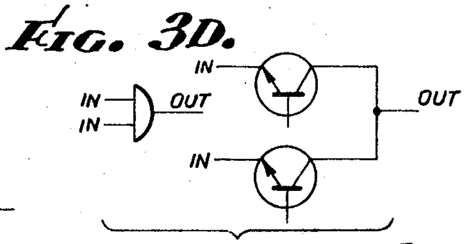

Within a logic circuit configuration using such "NOR" gates, no logic "AND" circuits have to be employed for combining the outputs of several "NOR" gates, because if one interconnects the respective output terminals, i.e., collector electrodes of either one of the circuits shown in FIG. 3A, 3B or 3C, a logic "AND" circuit is inherently established. By interconnecting the output collector electrodes of several of the units shown in FIGS. 3A, 3B, 3C, the combined output will be true only, if each unit is controlled towards establishing a true output at its collector. If one of these interconnected units is controlled to produce a false output, the output of the so-interconnected network is in toto false, thus acting as logic "AND" circuit indeed. However, for purposes of facilitating orientation and understanding, the conventional logic "AND" circuit symbol has been used in FIG. 2, and it is understood that this represents only a configuration such as shown in FIG. 3D, i.e., a two-input "AND" gate is in effect comprised of the interconnection of the collector electrodes of two transistors with each of the transistors pertaining to either one of the circuits shown in FIGS. 3A, 3B and 3C.

Proceeding now to the detailed description of FIG. 2, there are first provided set side and reset side output gates established by "NOR" circuits NS and NR respectively, and having their outputs fed back to one input of the respective other "NOR" circuit. For purposes of providing erasing to be described more fully below, there is an erase gate GQ provided to receive as one of its input signals of the "NOR" circuit NS. Of course, the output sides of either gate GQ and NR are connected to at least one amplifier for increasing the gain of the signal Q or $\overline{Q}$ as it is available for external use, which is not of logical consequence within the flip-flop. The free input terminals of the "NOR" circuits NR and NS, one each, are respectively controlled by a set switching gate GS and a reset switching gate GR, whereby the output of the set switching gate GS is fed to the free input terminal of the gate NR, while the output of the reset switching gate GR is fed to the free input terminals of gate NS. An erasing signal may be introduced via a gate GQ to force the circuit into the reset state. The circuit as described thus far constitutes a DC type flip-flop by itself. This circuit can also be called a "slave" flip-flop controlled by a "master" to be described next.

This "master" flip-flop processes four input signals. These input signals are, set command signal S fed into line 11, reset command signal R, fed into line 12; clock pulse C (line 13); and erasing signal E (line 16). For purposes of noise rejection as particularly resulting from coupling of the low-voltage-operated integrated circuit flip-flop to the higher-voltage-operated discrete element circuit logic (See FIG. 1), there are provided noise-rejector diodes D directly succeeding the input terminals for signals S, R, C and E. The input signals S, R, C and E are combined in a manner which permits control of the GS and GR gates to establish a "falling-clock-trigger-positive-clock-signal-assembling flip-flop."

The output states of the "slave" flip-flops are defined as follows: The output of either "NOR" gate is true only if both its inputs are false. Thus, for the set state, the two inputs for gate NS must be false. Since this true output of gate NS is fed back to one input of gate NR, the output of the latter gate is necessarily false which in turn locks one input of NS to the false state. Thus, for a stable set state, the output of gate GR must be false which is possible only if its signal input (output of a gate N1 is false due to the fact that the clock signal C is alternatingly true and false. On the other hand, the output of gate GS need not be true, since NR is locked to produce false output as long as NS is true. For the reset state, the situation is reversed.

The set control or switching gate GS and the reset control or switching gate GR are respectively controlled in the following manner. The switching operation for setting and resetting the flip-flop is to be carried out in synchronism with the clock pulses. In particular, it is desirable to operate the flip-flop in such a manner that any change in the output states of the "slave" flip-flop from the reset state to the set state or vice versa is triggered at the trailing or falling edge of the source of clock pulses to be applied to the terminal C.

The clock pulses C are usually regarded as positive or as being true when produced, while a negative or false clock pulse $\overline{C}$ is considered to exist at the time in between such positive or true clock pulses. This terminology will be maintained, but solely for purposes of convenience. The electrical polarity of any signal has no bearing on the logic as long as consistency is maintained, namely, that a true signal means one signal level and a false signal is established by a different signal level.

Since the trailing edge of a clock pulse occurs by definition at the end of the true clock pulse signal, the gates GS and GR are operated in such a manner that they are opened and permit passage of a signal at a time when a flip-flop switching operation is desired upon appearance of a false clock pulse $\overline{C}$. Thus, there is provided a first inverter, I1, of the type shown in FIG. 3A and having its input side connected to the terminal to which is applied clock pulse C, there being a noise-rejection diodes D interposed.

The output of this inverter I1 is passed to signal-separating amplifiers A3 and A4, which are of the type shown in FIG. 3C. Thus, the output of amplifiers A3 and A4 are true in case the clock pulse is false, so that the respective amplifier outputs can be logically represented as $\overline{C}$. These signals $\overline{C}$ are applied to the signal input terminal of the two gates GR and GS for passage or rejection in manner determined by the gating terminals of either one of these switching gates GS and GR.

The production of the switching pulses for the "slave" flip-flop is now to be explained, and this pulse generation basically depends on three factors. It depends first on the existence of nonexistence of a set command signal S, on the existence or nonexistence of the reset command signal R, and on the state of the flip-flop symbolically identified in a manner, that if the flip-flop is set, the signal $\overline{Q}$ is true, while in case of a reset state the signal $\overline{Q}$ is true. The circuit network is to be described in the following in fact combines the signals S, R and Q or Q in such a manner that a set override-reset feature is established.

Second, the flip-flop is maintained in whatever switching state it is if neither set nor reset switching command signal is true, and thirdly, an accept-input state is to be established during the positive clock pulse phase or period. This is one of the most significant features of this flip-flop namely, that it accepts inputs during the positive phase of the clock pulse, so that the duration of the clock pulse itself does not enter into the delay of operation of the flip-flop as it establishes a new output in response to a change in input signals. There is only the requirement, that the inputs must have settled at a particular time prior to occurrence of the trailing edge of a positive clock pulse. This period of time is very small, resulting primarily from the finite travel time of signals within the flip-flop and resulting further from the finite rise and fall times of any input signal including the clock pulses.

It is of particular importance that the response of this particular flip-flop is now reduced in comparison with the response time of a conventional flip-flop by a period of time which is equal to the clock pulse width plus tolerance thereof. In other words, the conventional rule that in a trailing edge or falling clock trigger-type flip-flop, the inputs must have settled at a particular tolerance time before the leading edge of a positive clock pulse can be dispensed with, thereby reducing the response time of the entire circuit drastically and thus reducing the probability of disturbances. This is important in computer operations in which there are numerous flip-flops (supra) and in which the operational time is significantly determined by such input-output delay of the multitude of flip-flops.

Proceeding now to the description of the circuit network which establishes the gating signals for the gates GS and GR, reference is made first to the gating terminal of the gate GR. There is provided the inverter N1, which is of the single input type (FIG. 3A) and which receives the output of an "AND" gate GE provided for purposes of introducing the erase signal E when desired. The "AND " gate GE is established by the interconnection of the output-collector electrodes of nor gate $N_2$ and an amplifier A5. The erase signal itself is derived from the E terminal via noise-rejection diodes D and inverter I2. Amplifiers A5 and A6 boost the gain of the signal E operating as gating signal for gates GE and GQ. Thus, the output of this circuit I2 is positive always for as long as no erasing is required, and this opens the gates GE and G2 for the nonerasing mode.

The signal input terminal for the gate GE receives the output signal of a second "NOR" circuit N2 combining the output of the gate GR, and the output of a set-reset signal combining gate GSR. The set-reset combining gate GSR receives a first coincidence signal from a "NOR" circuit N4 having two input terminals one of which is connected to draw on the the output side of the set switching gate GS, and the other input terminal of "NOR" circuit N4 receives the output of a "NOR" circuit N5, which in turn combines logically a signal drawn from the output side of the reset output gate NR which in effect is the signal $\overline{Q}$. The other input of "NOR" circuit N5 is the reset command signal R drawn from the reset input terminal via noise-rejection diodes D.

Thus, the output of circuit N5 is $\overline{R+\overline{Q}}$ or $\overline{R}Q$. The other input terminal of the set-reset signal combining gate GSR is provided by an inverter I3 receiving the set command signal S, also via noise-rejection diodes D. Thus the gate GSR is gated open by the $\overline{S}$ signal, and closed as long as $\overline{S}$ is not true, which means that the output of gate GSR will be false always as long as a set command signal stands on at the input terminal S.

If the flip-flop is set, the $\overline{Q}$ signal is false, which means that the output of "NOR" circuit N5 is true as long as there is no reset input signal R, so that the output of N4 is necessarily false which in turn means, that the second input of the gate GSR is likewise false during the set state of the flip-flop in the absence of a reset command signal R. The output of the gate GSR is in fact false independent from the duration of the signal S as long as the flip-flop is in the set state with no reset signal being applied. The output of gate GSR is also false for as long as a set signal S applied is true, independent from the status of the reset input signal R. This establishes the set override reset feature.

The set switching gate GS, particularly the gating terminal thereof, is controlled by a "NOR" circuit N3 having two inputs and either one of these two inputs has already been described. The first input is derived from the output side of gate GR, while the second input of the "NOR" circuit N3 is the just developed output signal of the set-reset combining gate GSR.

This circuit as outlined thus far provides for the following main features. First of all, either set or reset switching command signals S and R must be kept from the gates GS and GR when appearing during a period of time in which the clock pulse is false. This is important, because these gates are to respond to a false clock pulse for purpose of switching from one state to another. Since this is supposed to occur precisely at the trailing edge of a clock pulse (i.e., the beginning of a false clock pulse period) such switching command signals must be kept from the gates indeed when occuring already during a false clock pulse period, so that they will become effective only at the beginning of the next false clock pulse period, i.e., the trailing edge of a true clock pulse.

A second important feature of the circuit is that it defines an "accept input" operational state during the positive clock pulse phase. Thus, this circuit is possessed with features permitting the establishing of gating signals for the gates GS and GR during the positive clock pulse phase, whereby in addition it is important to maintain and clamp these switching command signals into the circuit at the time the clock pulse goes negative for switching operation. The accept input state is established with the aid of gates GS and GR in cooperation with the feedback paths between the output of gate GR and one input of the "NOR" circuit N4 on the other hand. This means in terms of circuit logic, that during the reset state of the flip-flop the output of "NOR" circuit N2 is defined by a coincidence signal defined as CS, and during the set state the output of "NOR" circuit N4 is defined by a coincidence signal defined as CR. Either coincidence signal defines the "accept input " state, in that for $\overline{C}$ neither command signal can pass the gates N2 and N4. The set-override reset feature is established by feeding the output of gate N4 through the gate GSR which suppresses any R command signal in the presence of a signal S. No S-suppressing gate exists as to R. However, as will be described more fully below, the gate GE operates as an S-command signal suppressor gate during the presence of an erase signal.

In the stable set state, the two input signals of the output set "NOR" gate NS are both false and one of the two inputs of the output reset "NOR" gate NR is always true. Accordingly, the reset control gate GR has a false signal input rendering the gate independent from the clock input signals C and $\overline{C}$.

In the set state, with neither input signal S and R being true, the output $\overline{Q}$ is false, so that the output of N5 is true, with that of N4 then being necessarily false; gate GSR is blocked. For the set state to remain stable, the "AND" gate GR must remain blocked. As long as gate GR is blocked, NOR-gate gate N2 has two false inputs and its output is thus true (gate GE being open), so that N1 goes false thus clamping gate GR to the false state. The clock has no influence on this condition. The locked false state of gate GR is also fed to nor gate N3. likewise having two false inputs, so that its output is true and gate GS opens and alternates its output signal at clock pulse rate, its output thus being $\overline{C}$Q. The resulting alternation of true and false signals for one input gate of N4 remains ineffective as long as reset command signal R is not true. "NOR" circuit N4 will change its state only when gate N5 is false, and then only during a positive clock pulse phase, signal $\overline{C}$Q then being false. This is the "accept reset command substate" for the flip-flop when set.

The states remain as described for as long as there is no input at either the set or reset command input terminals. The fact that the reset switching gate GR receives a true signal at its signal terminal when the clock goes negative (C) requires the following conditions:

For resetting the flip-flop, a control signal must be developed which, at falling clock produces a true output for gate GR as resetting switching signal. This signal turns the output signal Q of gate NS Q false with the output of NR, which is $\overline{Q}$, becoming true, provided that at the same time (falling clock) the output GS was false, which is possible only when prior the falling clock gate GS was blocked.

This being the objective, a reset command signal R must thus be processed as follows: (a) A reset signal R must be prevented from reaching the reset switching gate GR during a negative clock pulse, unless it was already true during the previous clock phase (b) A reset signal R when true during a positive clock phase must reach gate GR and a negative clock pulse must not remove this reset signal from gate GR. (c) a reset command signal R withdrawn from the reset input during the positive clock state and/or (d) a concurrently developed set input signal S should remove any true input at the gating input of gate GR. How the circuit of FIG. 2 meets all these requirements will be described next.

The critical point is the output signal of gate GSR which is $\overline{S}(\overline{Q}+\overline{C}R)$. Assuming now that reset command signal R turns true (spuriously or intentionally) while the clock pulse is still false, then the output of "NOR" gate N5 turns false, but "-NOR" circuit N4 blocks further transmission of this signal. Only when the clock goes positive, and if the signal R is still true, the circuit, then assumes the "accept input" state, and the output of "NOR" circuit N4 goes positive so that the output signal of gate SR becomes true, thereby reversing the state of elements N2 and N3 with the output of N3 turning false, gate G2 though being false during the positive clock pulse phase is locked to that state.

Decisive is now whether during the positive clock pulse phase a setting command signal does or does not appear and whether the resetting command signal R remains true or becomes false. If R turns false, and/or if S turns true, then the output signal of gate GSR turns false again, causing the N2–N4 arrangement to unlock gate GS and to relock gate GR. Assuming that be the case, then when the clock goes negative again, gate GR remains false and nothing happens; concurrently, of course, gate GS turns true at $\overline{C}$.

Assuming that towards the end of the positive clock pulse phase R is still true and that S is still false, then gate GR is biased to permit the pulse $\overline{C}$ to pass, while gate GS is biased to remain closed. At the instant the clock goes negative gate GR now opens up the flip-flop.

This has the following result. First, the output of gate NS turns false. Since for the duration of signal R with $\overline{S}$ being true, the output of gate N3 is false, gate GS has a false output even at the negative clock pulse phase ($\overline{C}$ being true), so that two false inputs at "NOR" circuit NR establish the reset state, signal $\overline{Q}$ when turning true clamps the output of NS to the false state.

Even though the clock pulse is now in pause, i.e., not true, the output signal of gate GSR remains true due to the feedback path running from the output of NR (i.e. signal $\overline{Q}$) to the input of "NOR" circuit N5. Specifically, and considering the reset state still at the negative clock pulse phase, the output of gate N5 is now clamped by $\overline{Q}$ to the false state regardless of further development of signal R.

The output of gate GS was false during the previous positive clock pulse phase as set state was maintained false by signal R during the negative clock pulse when switching occurred. This signal is fed back to gate N4. Thus, "NOR" circuit N4 receives two false inputs independent from the development at the reset command signal input terminal and provides a true signal to gate GSR. Thus, as long as no set command signal S appears, the output of GSR stays true, N3 being locked to the false output state and this clamps gate GS into the blocked state as long as the set input remains false. Assuming that no set input terminal appears, then the output of N3 is locked to the false state and gate GS remains closed independent from the clock pulse.

In the reset state, "NOR" circuits N4 and N1 provide true outputs, independently from the signal C or $\overline{C}$ clock. If during any succeeding negative clock pulse period the set command input terminal receives a true command signal S, immediately, i.e., clock independently gate GSR becomes false overriding all other signals fed to gate GSR: this includes any reset signal R. However, this set command signals does not pass through either circuit N2 or N3. This is so, since for a reset flip-flop state the output of gate GR is true during negative clock pulses, thus preventing the outputs of gates N2 and N3 to turn true. Thus, a spurious set signal cannot enter the control terminals of the output "NOR" circuits NS and NR, or their respective switching gates GS and GR. Particularly at a negative clock $\overline{C}$ a signal S will not override the clamping of gate GS to the blocked state. Upon positive going clock pulses, however, false signals prevail on all the inputs of "NOR" circuits N2 and N3 (GR turning false) now locking the information as false outputs of "NOR" circuit N1, and gate GR remains false. Gate GS is now opened via "NOR" circuit N3. but its output stays false during the positive clock pulse phase.

If during this "accept input" state the set signal turns false again, gate GR is opened again and gates GS closes. During positive clock pulse phase, gate GR is blocked by $\overline{C}$ being false, but the false output of gate GSR changes the feedback path via gates N2 and N1, to remove the positive gating signal for gate GR. If the set signal is still true at the time the clock falls, then the output of gate GS becomes true turning gate N4 to produce a false output, but this is of no particular avail at this instance; as long as the set signal remains true the signal S closes gate GSR anyway. The positive GS output turns "NOR" circuit NR to shift to the false output state, so that gate NS receives a negative feedback signal. Gate GR was turned false during the positive clock pulse phase and locked into the state, so that at the time of a falling clock signal, negative coincidence prevails at "NOR" circuits NS, the output thereof turning positive and locking gate NR to the false output state. The flip-flop is set.

Feedback from the output of "NOR" gate NR causes the output of the circuit N5 to go positive, thus locking N4 to the false state independent from the clock pulse for as long as no reset signal appears. The set signal S keeps gate GSR closed. Existence of the set signal thus prevents loading of a reset signal R if occurring during any subsequent positive clock pulse. In the latter case N4 would turn true again, but gate GSR remains blocked for as long as S is true.

Up to this point erasing has been ignored. An erase pulse E is effective in two ways: Assuming that the flip-flop is set, then a signal E blocks gate GQ causing the flip-flop output Q to become false if it was true regardless of any R OR S signal. During the next positive going clock pulse (or concurrently if E turned true at positive clock) negative coincidence prevails at "NOR" circuit NR which turns positive and thereby locks "NOR" circuit NS to a false output independent from the continuation of signal E. Accordingly, the output of "NOR" circuit N5 turns false, and since switching gate GS at that time was false, gate N4 turns true, but gate GSR will turn true only if signal S at that instant is false. If S is false, reset conditions are introduced into the circuits N1, N2, N3 and GR to be established still during positive clock pulse, to be maintained clock pulse independently until a set input signal appears.

The second effect of the erase signal E appears in the gate GE, blocking same immediately, so that upon falling of the clock, a positive signal appears at the output of GR as is the case of execution of a reset command signal.

Assuming that during an erase signal a set signal S is and continues to be true, then both gates GE and GQ are blocked for the duration of the erase signal. This maintains the output of switching gate Gr true for positive clock pulse and false for negative clock pulse, thus establishing at the point reset operating conditions. The output of gates GSR, however, has a false output signal as during setting conditions, and this is independent from the state of gates N4 and N5. The two input terminals for GS alternate in true and false states but in opposite directions thus maintaining one false input for NR, and the other one being derived from the closed gate GS, thus enforcing an erasing-override set condition.

If the flip-flop was reset, and if during the positive clock pulse (i.e. during the accept input period) erase and set inputs both turn true, then the set command signals CS are suppressed at gate GE, and gate GR will be open for passage of pulses $\overline{C}$ which is contrary to the normal phase of setting operation. Thus, in spite of the S signal being gated into the circuit during positive clock pulse phase, gate N3 turns false during the negative clock pulse phase, so that gate GS cannot trigger setting and its output stays false. If one uses the erase signal as another command signal other than merely erasing, then the flip-flop is an erase-override-set override-reset flip-flop, and a reset signal can be applied to either terminal R or to terminal E depending upon its use as signal to override or as signal to be overridden.

If the erase was a brief command signal arising during the positive clock pulse phase, the flip-flop resets (if it was set). If the set input is true and remains true beyond the erase signal, the flip-flop will be set again as soon as the clock turns false.

The need for the feedback path from the output of NR to one input of N5 will be appreciated from the foregoing description in summary: The set override reset operation requires a signal path which, on one hand, distinguishes logically between set and reset commands by logically opposite or complementary signal conditions. This is the signal path from the output of the set reset gate GSR providing a true signal for a reset command and a false signal for a set command with a set command turning this output false instantly and independently from the state of the flip-flop.

On the other hand, it must be assumed that in the absence of a set command signal the flip-flop when reset must be maintained in this state. The NR–N5 feedback path assures a true output of gate GSR for as long as $\overline{Q}$ is true, thus preventing disturbances from setting the flip-flop without a set command signal. At positive going clock pulses, a false output signal of gate GSR is fed to the two switching gates GS and GR for setting operation if needed and likewise at positive going clock pulses a true output signal of gate GSR is gated to the two switching gates GS and GR for resetting operation.

The set override reset feature is accomplished by combining set and reset command signals at the GSR gate, whereby presence of a set command signal serves to suppress a reset command signal, so that the output gate GSR is false as long as signal S is true regardless of signal R. These conditions can properly be maintained only if in the absence of a set command signal with the flip-flop being reset, the GSR gate cannot possibly produce a false output which then would be gated through the network for setting. This situation could occur in the absence of a resetting command signal. As long as the flip-flop is reset and by feeding back the reset-state signal $\overline{Q}$, the second input of gate GS is maintained and clamped to the false state to prevent setting of the flip-flop.

Should external disturbances be transmitted into the flip-flop, this is critical only during the reset state in the absence of any command signal. Such disturbances (noise) are temporary in nature and the loop NR–N5 ensures, that such disturbances do not alter stable conditions and cannot be clamped into or caught by the network and maintained therein. As was outlined above, during positive clock, any input command signal can be removed again, and if occurring sufficiently before the falling clock, no switching will occur. Noise is rendered ineffective in the same manner.

In the foregoing, it was explained how the new "falling clock-accept-input-during-clock" flip-flop reduces the probability that disturbances become effective within its circuitry. In the following, it will be described how external disturbances are to be kept from the flip-flop to permit its construction as integrated circuit to be operated at a low voltage.

FIG. 4 is an illustrative example of a discrete circuit logic to be used for controlling any of the inputs of FIG. 2, thus, FIG. 4 can be interpreted as a circuit forming either one of the input signals S, R, E or C for the integrated circuit flip-flop 10 (FIGS. 1 and 2). There are first shown the noise-rejection diodes D which preferably are part of the integrated circuit configuration and are shown here as "tie-in" for FIG. 2. All other elements are discrete circuit elements.

The logic network or signal assembly gate 40 provides the input signal proper. The network 40 is a representative example of a typical gate structure using discrete resistor and diode elements as stated and comprising an "AND"-"OR" gate configuration operated at the higher voltage V1. There are shown six diodes 41 which altogether establish three "AND" gates, with the respective outputs being combined in an "OR" gate composed of three diodes 42, having a common output at terminal 43. The signal at terminal 43 may be either one of the complimentary flip-flop input signals, $\overline{R}$, $\overline{S}$, $\overline{C}$ or $\overline{E}$. The discrete circuit logic such as 40 is operated at a voltage V1 of, for example, 16 volts.

Since the integrated circuit logic of flip-flop 10 (FIG. 1, 2) is operated at a lower voltage V2, for example, of 4.2 volts, a voltage-matching network 30 is interposed between line 43, i.e., the output of signal assembly gate 40, and the input terminal of noise-rejector diodes D. This matching or adapting network is comprised of a transistor amplifier 32 having its base electrode connected to line 43, its emitter electrode being grounded. The collector electrode of transistor 32 is connected to voltage source V1 via a diode 31 and a resistor 34, with the diode being poled in the direction of the collector current. Another connection of the collector electrode of transistor 32 leads to voltage source V2 via a resistor 35. The output terminal of this network is the junction 36 of the anode of diode 31 and resistor 34.

Crrent flows from voltage source V1 through resistors 34, 35 to source V2 if transistor 32 is nonconductive. If resistor 34 is large relative to resistor 35, the voltage at terminal 36 will approximate V2. If the transistor is rendered conductive, the current will flow from diode 31 through the transistor to ground with the potential at terminal 36 being slightly above ground. Thus, the transistor being a discrete circuit element is driven by the higher voltage V1, and its control input at base also alternates between this value and ground. The output terminal 36 of this network, however, never exceeds the low-voltage V2 for the integrated circuit. A diode 37 couples terminal 36 TO the noise-rejector diodes 2.

I claim:

1. An integrated circuit flip-flop having a master portion and a slave portion controlled by the master portion, the slave portion including a first and second inverting signal means, each having two inputs and an output coupled to one input of the respective other signal means to provide a set reset type flip-flop as the slave flip-flop, the remaining two inputs defining first and second input terminals of the slave flip-flop, there being means to provide clock pulses, the master portion comprising:

a third and a fourth inverting signal means, each having two inputs and an output coupled to one input of the respective other signal means;

a fifth inverting signal means having an input and an output;

a sixth signal means having two inputs and an output coupled to the input of the fifths signal means, the output of the fifth signal means coupled to one input of the sixth signal means;

first gating means combining the output of the fourth signal means and the clock pulses and connected to provide a control signal to the first input terminal of the slave flip-flop;

second gating means combining the output of the fifths signal means and the clock pulses and connected to provide a control signal to the second input terminal of the slave flip-flop;

first circuit means connected to provide the output of the fifth signal means to the other input of the fourth signal means;

second circuit connected to receive a reset input and to provide the reset input to the other input terminal of the third signal means so that the second gating means provides clock variable output in response thereto; and third circuit means connected to receive a set input signal and to provide the set input signal to the other input terminal of the sixth signal means so that the first gating means provides clock variable output.

2. An integrated circuit flip-flop as in claim 1, there being means to couple the third circuit means to the one input of the fourth signal means.

3. An integrated circuit flip-flop as in claim 2, there being gating means combining the outputs of the first signal means and of the second circuit means.

4. An integrated circuit flip-flop as in claim 1, there being fourth circuit means connecting the output of the slave flip-flop to the second circuit means to provide a combined input for the third signal means, there being fifth circuit means connecting the other input of the sixth signal means to the output of the third signal means.

5. An integrated circuit flip-flop having a master portion and a slave portion controlled by the master portion, the slave portion including a first and second inverting signal means, each having two inputs and an output coupled to one input of the respective other signal means to provide a set reset-type flip-flop as the slave flip-flop, the remaining two inputs defining first and second input terminals of the slave flip-flop, there being means to provide clock pulses, the master portion comprising:

first gating means CN1, GR) connected for receiving the clock pulses and having an input for receiving a gating signal and having an output connected to the first terminal to provide thereto a clock pulse variable signal varying between a first and a second level when receiving a gating open signal during the reset state, and providing a clock pulse independent signal at the first level to the first terminal when receiving a gating close signal during the set state;

second gating means (N3, GS) connected to receive the clock pulses and having an input for receiving a gating signal and having an output connected to the second terminal to provide thereto a clock pulse variable signal, varying between the first and second level when receiving a gating open signal during the set state, and providing a clock pulse independent signal at the first level to the second terminal when receiving a gating closed signal during the reset state;

first gate control means (N2) connected to receive a signal corresponding to the output of the first gating means, for input gating, and further connected to receive a set input signal only when the clock pulse dependent output of the first gating means has the first level, and providing an output as gating open signal to the first gating means in response thereto;

second gate control means (N4) connected to receive the output of the second gating means and further connected to receive a reset input signal only when the clock pulse dependent output of the first gating means has the first level, and providing an output as gating open signal to the second gating means in response thereto;

circuit means interconnecting the first and second gate control means to provide gating signals having opposite gating effects on the first and second gating means, the gate control means changing outputs in response to reception of a set or of a reset signal during a first clock pulse period when the first or the second gating means provide first level outputs in unison, to alter clock pulse dependency of output to be effective upon change over the next second clock pulse period;

the circuit means further including means connected to stabilize the gating open and closed signals as established during first clock pulse periods to persist at least during the next second clock pulse period and until reception of a reset or of a set signal, respectively, during a first clock pulse period thereafter, the circuit means including a connection to the output of the slave flip-flop.

6. Flip-flop as in claim 5, the circuit means including a gate combining the output of the second gate control means and of the set signal input to provide a control signal, effective as gating signal for the second gating means as well as set input for the first gate control means, to obtain set override reset operation.

7. In a data processing system, a first flip-flop constructed as integrated circuit and having set and reset input terminals and output terminals;

a plurality of second flip-flops each being also constructed as integrated circuit and each having input and output terminals; a circuit logic including discrete diode-type elements, resistor elements and connection means for interconnecting output terminals of said second flip-flops to form composite input signals and for applying same to said input terminals of said first flip-flop;

first voltage-supply means connected to operate said first and second flip-flops at a relatively low voltage;

second voltage-supply means connected to operate the elements of the circuit logic at a substantially higher voltage; circuit means connecting the circuit logic to said terminals and further connected to the first and to the second voltage-supply means to adapt the level of the composite signals as formed in the circuit logic to a lower level for the first flip-flop; and at least one diode for each input terminal, respectively connected in series between the circuit means and each said input terminal of the first flip-flop, at a polarity in forward direction as to the signal polarity.

8. In a system as in claim 7, the circuit means including a second diode connected series with one of said diodes but for oppositely directed current conduction, the second diode connected to the first and second voltage-supply means to be biased in forward direction by the differential of the two voltages.

* * * * *